United States Patent [19]

Taylor et al.

[11] 3,971,398

[45] July 27, 1976

[54] APPARATUS FOR AUGMENTING VENOUS BLOOD FLOW

[76] Inventors: Duane F. Taylor, 680 Winter St., SE., Salem, Oreg. 97301; Richard C. Everett; Harry F. Everett, both of 6159 SW. Fernbrook Circle, Lake Oswego, Oreg. 97034; Norman C. Williams, Rte. 1, Box 134, West Linn, Oreg. 97068

[22] Filed: Nov. 25, 1974

[21] Appl. No.: 526,818

Related U.S. Application Data

[62] Division of Ser. No. 422,208, Dec. 6, 1973, Pat. No. 3,892,229.

[52] U.S. Cl. .............................. 137/119; 137/624.14

[51] Int. Cl.[2] .............................. F16K 11/22

[58] Field of Search ................ 137/624.14, 119, 121

[56] References Cited

UNITED STATES PATENTS

| | | | |
|---|---|---|---|
| 2,760,511 | 8/1956 | Greef | 137/624.14 X |
| 3,614,965 | 10/1971 | Metivier | 137/119 |
| 3,722,525 | 4/1971 | Epple | 137/119 X |

*Primary Examiner*—Robert G. Nilson
*Attorney, Agent, or Firm*—Klarquist, Sparkman, Campbell, Leigh, Hall & Whinston

[57] ABSTRACT

Apparatus, adapted for use in explosive as well as non-explosive atmospheric environments, for alternately applying intermittent compression to the legs of a patient during surgery, postoperative recovery periods and other periods of muscular inactivity to accelerate venous blood flow in the lower extremeties and inferior vena cava and thereby prevent blood clotting in these vessels. A pair of double-walled pneumatic leggings adapted to extend from the ankle to the knee of the patient are provided for fitting on each leg. Each legging is connected by a separate conduit to a non-electrical regulating and timing control circuit adapted to receive compressed air, oxygen or other pressurized gas from any available source and transmit it by means of periodic intermittent pulses alternately to each legging. The control circuit includes a pressure regulating valve for reducing the available inlet supply pressure to a suitable working pressure and adjustable metering valves for controllably varying the volumetric flow rate of gas to each legging to thereby control the time rate of pressure build-up of each pulse. Respective adjustable pressure relief valves are also provided for variably controlling the maximum pressure permitted in each legging and for relieving the pressure at the end of each pulse. The control circuit includes a timing system for causing the pulses to be delivered at alternate regular intervals to the respective leggings, such timing system being adapted to operate entirely by pneumatic actuation so as to eliminate explosion hazard in high oxygen environments. Such timing system comprises a two-diaphragm cycling valve for automatically regulating the alternate charge and discharge of a pair of accumulator tanks, each tank controlling by means of a predetermined rate of pressure increase the timing of the pulses to the respective leggings. The timing system is operatively independent of legging pressure to eliminate the possibility of cycle failure if a legging should develop a leak or become disconnected.

2 Claims, 6 Drawing Figures

APPARATUS FOR AUGMENTING VENOUS BLOOD FLOW

CROSS REFERENCE TO RELATED APPLICATION

This application is a division of application Ser. No. 422,208 filed Dec. 6, 1973 and allowed Nov. 6, 1974 now U.S. Pat. No. 3,892,229.

BACKGROUND OF THE INVENTION

This invention relates to improvements in apparatus for intermittently compressing a patient's leg muscles during surgery or any other periods of muscular inactivity or paralysis in order to accelerate venous blood flow and thereby prevent blood clot formation in the lower extremities and pelvis. More specifically the apparatus is of the type wherein individual pneumatic leggings are provided for fitting around the patient's lower leg and wherein a pneumatic control circuit is provided for automatically regulating the timing, rate of pressurization and maximum pressure of periodic pneumatic pulses delivered alternately to each legging.

Persons undergoing surgery and extended post-operative recovery or prolonged bed rest and inactivity for any reason have in the past been particularly susceptible to a condition known as "deep vein thrombosis" which is a clotting of venous blood in the lower extremities and pelvis. The clotting occurs because of the absence of sufficient muscular activity in the lower legs required to pump the venous blood, and can be life-threatening if a blood clot migrates to the heart and interferes with pulmonary blood circulation. Statistics indicate that deep vein thrombosis occurs to some degree either during or shortly after surgical procedures in approximately 30% of all surgical patients.

Because of the high incidence and potential severity of the condition, several means of thrombosis prevention have been devised in the past. Most notable among these is the provision of pneumatic leggings or boots adapted to fit around the calf and foot of a patient's legs, such leggings being connected to pump apparatus which sends alternate intermittent pulses to each of the leggings to periodically compress and release the calf muscles and thereby accelerate blood flow. No appreciable venous backflow results from such intermittent compression because a series of one-way valves in the venous system permits the blood to move only in an upward direction. Although such apparatus has proven to be effective in the prevention of deep vein thrombosis, it has also suffered from several disadvantages. One serious deficiency has been the reliance of such apparatus on electrical power for pneumatic pumping and timing cycle control, causing a serious fire or explosion hazard when such electrical components are utilized in a surgical or post-operative environment where highly inflammable substances such as anesthesias and oxygen abound. Another disadvantage of prior apparatus is that they provide sufficient adjustability of the pressurization process, such as regulation for each leg of the rate of pressure build-up, the duration of the duty cycle and the maximum pneumatic pressure applied. Consequently the prior apparatus are not sufficiently versatile to be used on a patient whose legs, for example, may be especially tender or sore requiring lower pressure levels, nor is such apparatus adapted to permit the gradual increasing of pressure levels so that the patient may, without experiencing pain, gradually adapt himself to a higher pressure level. Because of the lack of adjustability such prior apparatus are also not adaptable for the treatment of certain conditions where a lower pressure range than that normally desired for the treatment of deep vein thrombosis would be advantageous, such as in the treatment of "venous insufficiency related stasis ulcer". Finally, pneumatic leggings used in the past have been constructed so as to compress most or all of the foot as well as the muscles of the lower leg, a feature which not only provides no particular advantage but tends to limit circulation in the foot and thus may be harmful.

Accordingly there presently exists a need for an improved alternating leg compression system which operates entirely without electricity, thereby eliminating all fire or explosion hazard, and is independently adjustable for each leg with respect to compression levels and the rate of pressure application so that it is adaptable for use with patients having widely varying leg conditions.

SUMMARY OF THE PRESENT INVENTION

The present invention is directed to an alternating leg compression apparatus of the general type described featuring a novel control circuit for automatically and alternately providing intermittent compression pulses to a pair of pneumatic leggings, such control circuit being adapted to connect to any pressurized gas supply normally available in hospital settings and operating entirely by means of pneumatic power without electrical input or circuitry of any kind. Precise cycling of the alternate pneumatic pulses delivered to the respective leggings is provided by a timing system comprising a unique shuttle valve which automatically controls the alternate pneumatic charge and discharge of a pair of accumulator timing tanks, each controlling the period of the pulses to a respective legging in response to the time required to charge each tank to a predetermined pressure. The timing tanks are coupled to respective diaphragm-controlled valves which regulate the input of pneumatic flow increments to the leggings and also isolate the timing system from the pressure levels in the leggings to insure against misapplication of pressure if one of the leggings should inadvertently become disconnected or develop a leak.

The control circuit is adapted for connection to virtually any source of pressurized air, oxygen or other gas normally available in a hospital by virtue of a pressure regulator at its inlet port which automatically reduces the supply pressure to a level suitable for use in the system. Maximum pressure in each legging may be adjusted by means of a pair of manually adjustable relief valves which automatically relieve the pressure in a respective independently varied by means of a pair of manually adjustable metering valves which regulate the volumetric flow rate of gas into the respective leggings. Improved double-walled pneumatic leggings are provided for fitting on the lower portion of a patient's legs between the ankle and knee, such leggings being constructed so as not to include the patient's foot within the pressure application zone.

It is therefore a primary objective of the present invention to provide an improved apparatus for augmenting venous blood flow in the leg as a means of preventing blood clot formation in the lower extremities and pelvis, particularly under surgical and post-operative recovery conditions.

It is a primary feature of the present invention that such leg compression apparatus is adapted to utilize virtually any pressurized gas supply normally available in hospitals and requires no electrical power or electrical actuation of any kind to achieve the alternating periodic pulses and pressure adjustments desired, so as to eliminate any possibility of fire or explosion in inflammable environments.

It is a further feature of the present invention that highly variable adjustments of the maximum pressure exerted on each leg, the rate of pressure rise of each pneumatic pulse and the duration of each pulse be provided so as to adapt the apparatus to varying patient conditions and requirements.

It is a still further feature of the present invention that the pneumatic leggings utilized be constructed so as to compress the patient's leg muscles without simultaneously exerting pressure on the foot, so as to prevent interference with foot circulation and compression-abrasion and blister formation of the heels and between the toes.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
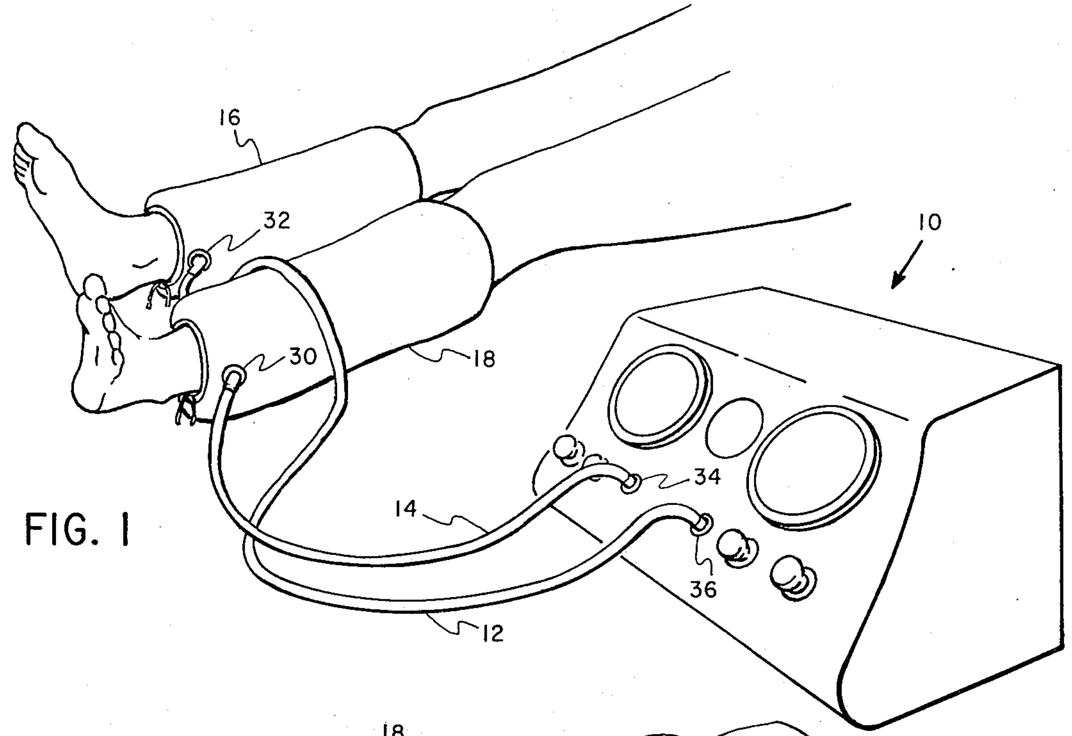
FIG. 1 is a perspective view showing application of the alternating leg pressure unit to a patient's legs.
Figure 2:
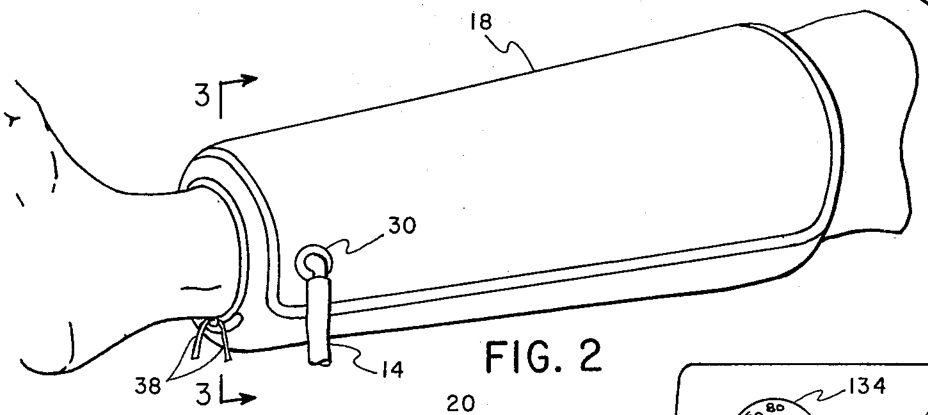
FIG. 2 is an enlarged detail view of a pneumatic legging utilized in the present invention.
Figure 3:
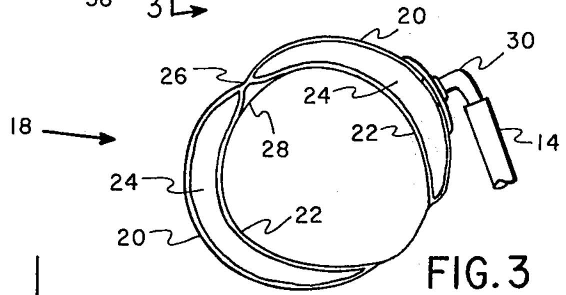
FIG. 3 is a sectional view of a pneumatic legging taken along line 3—3 of FIG. 2.

The alternating leg compression appartus of the present invention comprises a compression control unit, designated generally as 10 in FIG. 1, adapted to be coupled by means of a pair of conduits 12 and 14 to respective pneumatic leggings 16 and 18. As best seen in FIGS. 2 and 3 each legging comprises a sleeve adapted to fit around a person's lower leg, such sleeve being constructed of vinyl or other flexible, fluid impervious material and having an outer wall 20 and an inner wall 22 defining a fluid compression chamber 24 adapted to extend from the knee to a position no lower than the ankle. The chamber 24 is divided into two sections by a seam 26 which extends through most but not all of the length of the chamber, thereby providing for a coupling portion 28 at one or both ends of the chamber by which both chamber sections communicate with one another. Each legging has a fluid input coupling 30 and 32 respectively adapted for coupling by means of conduits 12 and 14 with the respective fluid outlet ports 34, 36 of the control unit 10.

The leggings receive alternating periodic flow increments or "pulses" of pressurized fluid from the outlet ports 34, 36 in a manner to be described more fully hereafter, each such pulse constituting a gradual pressure rise during which the chamber 24 of each legging is filled so as to compress the enclosed leg muscle followed by a relatively abrupt relief of such pressure permitting the chamber 24 to collapse and thereby release compression on the muscle. A tie string 38 is provided at the lower end of each legging for snugly securing the sleeve to the leg. This feature prevents any downward slippage of the chamber 24 below the ankle regardless of whether the chamber is in a pressurized or collapsed condition and thereby insures against the application of pressure to the patient's foot which might impede circulation.

Figure 4:
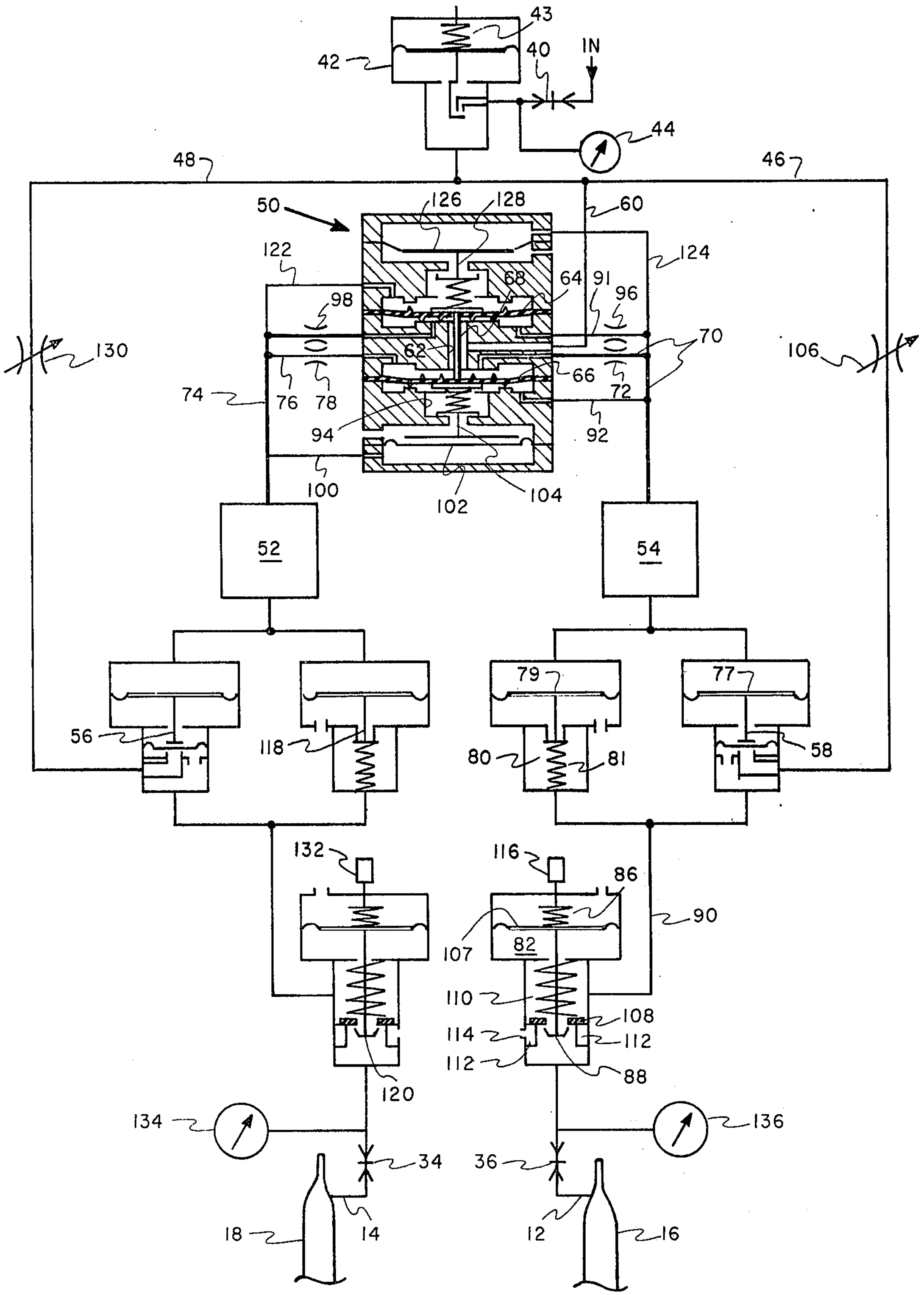
FIG. 4 is a schematic diagram of the control circuit for delivering alternating periodic pulses to the respective leggings, with the structure of certain valves shown in section.

The control unit 10 which delivers the alternating periodic flow pulses to the respective leggings is of a unique construction adapted particularly for use under inflammable or explosive atmospheric conditions, having no electrically actuated components of any kind and providing a high degree of adjustability with respect to the maximum pressure and duration of pulses exerted on each leg. Referring specifically to FIG. 4, the circuit of the control unit 10 essentially comprises an inlet port 40 adapted for coupling to any suitable source of pressurized fluid normally available in hospitals, for example pressurized air or oxygen, respective outlet ports 34, 36 adapted for coupling with the pressure leggings 16, 18 and an exclusively fluid-operated control circuit interposed between the inlet port and outlet ports. The control circuit comprises a pressure regulating valve 42 for automatically decreasing the pressure of the fluid received from the available source to a predetermined pressure suitable for use in the leg compression system. Source pressure, indicated by a pressure gauge 44, may range anywhere from approximately 8 to 100 psi and is preferably reduced by the pressure regulator 42 to approximately 5 psi, depending on the setting of adjustable regulator spring 43. Fluid at reduced pressure flows through lines 46 and 48 to the respective leggings 16, 18 in alternating periodic flow increments or "pulses" determined by the automatic actuation of a pair of control valves 56, 58 interposed in the respective lines.

The alternating cyclic actuation of the control valves 56, 58 is controlled by an automatic fluid operated timing system comprising a pressure responsive shuttle valve designated generally as 50 coupled to a pair of accumulator timing tanks 52, 54. The shuttle valve has a first position for feeding pressurized fluid to timing tank 54 and a second position for feeding fluid to timing tank 52. The positions are exclusive of one another so that only one timing tank is being filled at any given time. When one timing tank has filled to a predetermined pressure, such pressure acts automatically to shift the shuttle valve to a position to begin filling the opposite timing tank, and in so doing triggers its own exhaust. The exhaust of a timing tank causes the respective control valve 56 or 58 to which the particular tank is connected to initiate a pulse to a legging. Since the shuttle valve 50 causes the respective timing tanks to fill during alternate intervals, the pulses in the respective leggings 16, 18 are therefore initiated alternately. Having briefly summarized the function of the timing system, the structure and operation will now be explained in detail.

The shuttle valve 50 receives pressurized fluid from the pressure regulator 42 through line 60 into its inlet chamber 62. The fluid pressure is applied upwardly and downwardly against a pair of flexible diaphragms 64, 66 which are joined together by a connecting member 68 so as to move upwardly and downwardly in unison. Because the diaphragm pair is unstable unless in a fully "up" or fully "down" position, the pair will instantly assume one of the two positions (for example the "down" position indicated in FIG. 4) upon exposure to inlet pressure and be held there due to the difference in exposed area of the two diaphragms to the inlet pressure. In the "down" position, inlet fluid from line 60 goes through inlet chamber 62, timing restrictor 72 and timing tank feed line 70 to an accumulator timing tank 54. Simultaneously flow is blocked by diaphragm 64 to the timing tank feed line 74 which communicates with tank 52 (no appreciable flow occurs through pilot line 76 due to the extremely small restriction imposed by restrictor 78). As the pressure in timing tank 54 begins to rise, diaphragm 77 of control valve 58 is pushed down, blocking fluid flow in line 46 while diaphragm 79 of valve 80 is also pushed down against spring 81 to insure that chamber 82 of valve 88 is exhausted, thereby permitting spring 86 to open valve 88 downwardly. The opening of valve 88 ultimately will permit fluid flow through line 90 into legging 16 when control valve 58 subsequently opens. During the period of pressure build-up in tank 54, no fluid flow or pulse is initiated or maintained at outlet port 36 or in legging 16.

When the pressure in tank 54 rises to approximately 60% of the pressure in inlet chamber 62, the pressure imposed through lines 91 and 92 on the underside perimeter areas of the diaphragms 64, 66 causes both diaphragms to lift slightly, allowing fluid at tank pressure also to enter chamber 94 beneath diaphragm 66. This adds to the effective pressure area tending to push the diaphragms upward, and instantly causes the diaphragm pair to snap into its upward position. The shift in diaphragm position blocks any further supply of fluid through line 70 to timing tank 54, there being no appreciable flow of fluid to tank 54 through line 91 due to the severe restriction imposed by restrictor 96. Simultaneously with the upward movement of the diaphragm pair, a flow of pressurized fluid through restrictor 98 and timing tank feed line 74 is initiated so as to begin the rise of pressure in the opposite timing tank 52. As the pressure in tank 52 beings to build up, it acts through pilot line 100 to shift diaphragm 102 upwardly thereby opening the exhaust valve 104 of timing tank 54. This immediately exhausts the pressure in tank 54, resulting in the simultaneous opening of control valve 58 and the closing of valve 80. The opening of valve 58 initiates the beginning of a flow increment or pressure pulse through line 46, valve 58, line 90, valve 88, outlet port 36 and conduit 12 to legging 16. At this time no pulse is being transmitted to the other legging because pressure is rising in tank 52 and control valve 56 is therefore closed.

The initiation of fluid flow to legging 16 causes a gradual pressure build-up in the compression chamber of the legging, the time rate of pressure build-up being determined by the volumetric flow of the fluid which is controlled by a manually adjustable flow metering valve 106 interposed in line 46. Flow to legging 16 continues until the pressure in the legging, as sensed in chamber 82, of valve 88, rises to the point where the upward force on diaphragm 107 overcomes the downward force exerted by spring 86 and thereby raises valve 88 to a closed position. In the act of closing, valve 88 raises a flexible rubber disc poppet 108 against the force of spring 110, thereby permitting the pressurized fluid in the legging 16 to exhaust through chamber 112 and exhaust port 114 and relieve compression on the leg. Accordingly valve 88 acts as a relief valve which terminates each pulse as soon as the pressure in the legging 16 reaches a maximum predetermined pressure determined by the force exerted by spring 86. Such spring force is manually adjustable by means of screw adjustment 116, so as to vary the maximum pressure setting.

It should be noted that relief valve 88 is bi-stable in the sense that, once the maximum predetermined relief pressure in legging 16 has been reached, thereby forcing valve 88 upward, the valve is retained in its upward "relieving" condition by the fact that chamber 82 remains pressurized until the pressure is subsequently relieved by the opening of valve 80. Valve 80 does not open however until the pressure in timing tank 54 once more begins to rise, which occurs only after the passage of a predetermined time period when the pressure in the opposite timing tank 52 has risen sufficiently to shift the diaphragm pair 64, 66 once more into a downward position.

During the period that the flow increment pulse was being delivered to legging 16, pressure in timing tank 52 was gradually rising due to the upward position of the diaphragm pair 64, 66, while timing tank 54 was open to atmosphere through exhaust valve 104. The rate of pressure rise in tank 52 is precisely the same as the rate of pressure rise in tank 54 by virtue of the fact that the tanks are the same size and timing restrictors 98 and 72 respectively are identical, causing identical volumetric fluid flow rates to the tanks during their respective charging periods. Since the tanks 52 and 54 and their associated valveing are duplicates of one another, the pressure rise in tank 52 has the same effect on valves 56, 118 and 120 as did the pressure rise in tank 54 on corresponding valves 58, 80 and 88. After the pressure in tank 52 has risen to the same level previously required to cause the upward shifting of the diaphragm pair 64, 66, the pressure imposed upon the upward perimeter areas of the diaphragms through lines 76 and 122 causes a downward snapping of the diaphragms, thereby terminating flow to tank 52 and initiating flow to tank 54. As soon as the pressure in tank 54 rises to the same level previously required to open exhaust valve 104, such pressure acting through line 124 on diaphragm 126 opens the opposite exhaust valve 128, thereby exhausting tank 52 through line 122. This in turn opens control valve 56, initiating a pressure pulse in legging 18 at a rate of pressure rise determined by adjustable flow metering valve 130. The pressure rise continues in legging 18 until the maximum predetermined pressure, as determined by adjustment 132, is reached and the pressure in legging 18 is thereby relieved. While the pulse is being delivered to legging 18, pressure in timing tank 54 is once more building up toward the point where it will shift the diaphragm pair upwardly, resulting in the exhaust of tank 54 and the initiation of a new pulse to legging 16, and so on repeatably until the control unit 10 is disconnected from the pressure source.

Figure 6:
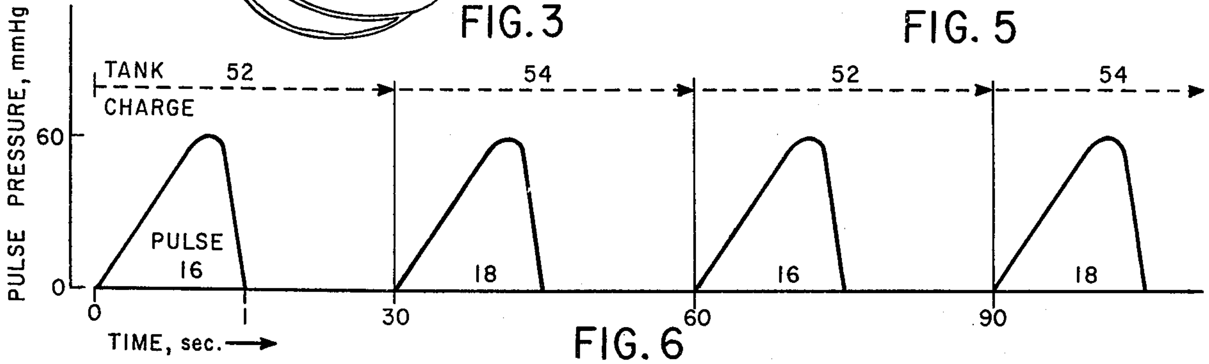
FIG. 6 is a graph illustrating the alternating periodic pulses generated by the control circuit.

Accordingly it will be recognized that the two sides of the control circuit which feed outlet ports 34 and 36 and leggings 18 and 16 respectively are identical in operation with respect to the initiation of pulses, the initiating cycle for each side of the circuit occurring during alternate intervals because of their mutual coupling through the shuttle valve 50. The resultant pulse pattern produced by the control circuit is illustrated in FIG. 6. The initiation of each pulse is triggered by the exhaust of a respective timing tank. Since the exhaust of one timing tank is substantially concurrent with the beginning of pressure rise in the opposite timing tank, the interval between initiation of a pulse in legging 16 and the initiation of the next succeeding pulse in legging 18 is the time necessary to charge one tank to a pressure sufficient to initiate the exhaust of the tank through the shifting of shuttle valve 50. The period between the initiation of successive pulses in the same legging is twice this charge time. Available data indicates that practical and optimum, venous blood flow is attained at compressive increases of approximately 8 mm. of mercury per second, reaching a maximum pressure of about 60 mm. of mercury. No appreciable dwell time at maximum pressure is needed, but a substantial decompressive pause is desirable for venous filling before recompression. Accordingly, in the preferred embodiment, the timing system has been designed so as to provide for an interval of 60 seconds between the initiation of successive pulses in the same legging. This means that the charge time for each timing tank will be at least 30 seconds and, as a practical matter, probably a few seconds more to account for some time lag between the initiation of flow to one tank and the exhaust of the other occasioned by the time necessary to open the respective tank exhaust valves 104 and 128. The tank charge times, and the resultant intervals between pulse initiations, can be precisely determined by proper selection and matching of restrictors 72 and 98, and can be varied by changing such restrictors.

Figure 5:
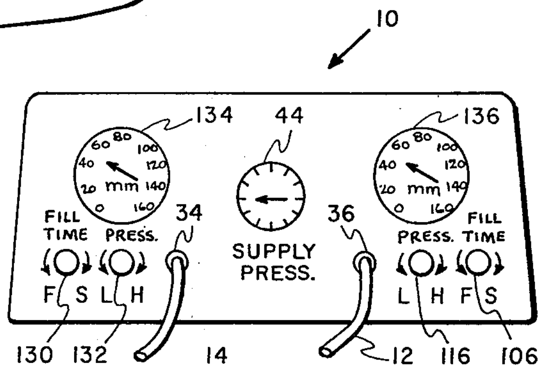
FIG. 5 is a front view of the operator console of the control circuit.

Although the control circuit operates symmetrically with respect to the timing of pulse initiations, the maximum pressure, rate of pressure rise and duration of the pulses delivered to the respective leggings need not be identical and in fact are separately adjustable so as to provide sufficient versatility to accommodate patients having varying leg conditions. The maximum pressure of the pulses in each legging is separately controllable by the aforesaid adjustments 116 and 132 respectively which control the spring forces on relief valves 88 and 120. These adjustments should preferably provide maximum pressure variation within a range of at least 20 mm. to 80 mm. of mercury. The adjustment controls are provided on the face of the control unit 10 as shown in FIG. 5, the unit being provided with separate pressure gauges 134 and 136 coupled with the respective outlet ports 34 and 36 to indicate the precise pressure levels in the respective leggings as an aid to adjustment. With the foregoing separate pressure adjustments it is possible to have a large discrepancy between te maximum pressures of the pulses in the respective leggings to accommodate a patient who, for example, may be suffering soreness in one leg but not the other.

The duration of the compressive pulses may also be adjustably varied separately in each legging, independently of both pulse interval and maximum pressure setting. This is accomplished by the individual adjustment of variable metering valves 106 and 130 so as to provide particular predetermined time rates of pressure increase in the respective leggings, thereby variably controlling the point in time when each pulse reaches the predetermined maximum relief pressure and thereby terminates itself.

It is significant that the adjustment of maximum pressure and duration of the individual pulses in no way affects the time interval between initiation of the respective pulses. This is due to the unique isolation of the timing system from the remainder of the control circuit by the diaphragms of valves 56, 58, 80 and 118. These diaphragms separate the fluid in the timing tanks 52 and 54 from the fluid delivered to the respective outlet ports 34, 36 and thereby render the pressure in the timing tanks independent of outlet port pressure. Thus not only is the timing system isolated from any effect of the aforesaid adjustments but also from any effect of pressure leaks or accidental disconnection of the leggings, thereby eliminating any chance of timing cycle failure and resultant injury to the patient.

It will thus be appreciated that the improved alternating leg compression system of the present invention operates entirely without electricity, thereby eliminating all fire or explosion hazards, while providing a high degree of adjustability with respect to pressure and compression duration.

The terms and expressions which have been employed in the foregoing abstract and specification are used therein as terms of description and not of limitation, and there is no intention, in the use of such terms and expressions of excluding equivalents of the features shown and described or portions thereof, it being recognized that the scope of the invention is defined and limited only by the claims which follow.

What is claimed is:

1. In a shuttle valve structure, a valve body having a first pair of spaced diaphragm chambers and a supply passage extending therebetween with a supply port connected to the passage, a pair of unstable diaphragms mounted in the diaphragm chambers, means extending through the supply passage and connecting the diaphragms for movement together between first positions engaging one end of each of the chambers and second positions engaging the other end of each of the diaphragm chambers, the inner ends of the chambers having central raised portions and depressed outer portions so that the diaphragms engage only the raised portions, the body having a pair of actuating passages having chamber inlet ports opening into the depressed outer portions of the chambers and also having a pair of outlet passages leading from chamber outlet ports at the raised portions to the exterior of the valve body, the outer ends of the chambers having raised portions spaced radially inwardly from the outer walls thereof and depressed outer portions so that the diaphragms engage only the last-mentioned raised portions, the valve body having a pair of passages having chamber inlet ports at the last-mentioned depressed outer portions.

2. The shuttle valve structure of claim 1 wherein the valve body has exhaust ports thereof opening into the inner portions of the outer chambers, a pair of valve means normally closing the exhaust ports, and a pair of diaphragms for moving the valve means to open positions.

* * * * *

UNITED STATES PATENT OFFICE
CERTIFICATE OF CORRECTION

PATENT NO. : 3,971,398

DATED : July 27, 1976

INVENTOR(S) : Duane F. Taylor, et al

It is certified that error appears in the above-identified patent and that said Letters Patent are hereby corrected as shown below:

Col. 3, line 42, change "appartus" to --apparatus--.

Col. 5, line 42, change "beings" to --begins--.

Col. 7, line 50, change "te" to --the--

Signed and Sealed this

Fourth Day of January 1977

[SEAL]

*Attest:*

RUTH C. MASON
*Attesting Officer*

C. MARSHALL DANN
*Commissioner of Patents and Trademarks*